US007798728B2

(12) United States Patent
Lee

(10) Patent No.: US 7,798,728 B2
(45) Date of Patent: Sep. 21, 2010

(54) CAMERA LENS COVER DEVICE AND MOBILE COMMUNICATION TERMINAL HAVING THE SAME

(75) Inventor: Myung-Ho Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 505 days.

(21) Appl. No.: 11/775,664

(22) Filed: Jul. 10, 2007

(65) Prior Publication Data

US 2008/0019000 A1 Jan. 24, 2008

(30) Foreign Application Priority Data

Jul. 19, 2006 (KR) ...................... 10-2006-0067668

(51) Int. Cl.
*G03B 17/00* (2006.01)
(52) U.S. Cl. ................. 396/448; 348/376; 359/511
(58) Field of Classification Search .............. 396/448; 348/376; 359/511
See application file for complete search history.

(56) References Cited

U.S. PATENT DOCUMENTS 6,339,681 B1 * 1/2002 Takeshita ..................... 396/79

| 2002/0176714 | A1* | 11/2002 | Nakanishi et al. ............ 396/448 |
| 2003/0142971 | A1* | 7/2003 | Nishiwaki et al. ............ 396/176 |
| 2004/0041935 | A1* | 3/2004 | Nagamine et al. ............ 348/335 |
| 2006/0034605 | A1* | 2/2006 | Kim et al. .................... 396/448 |
| 2007/0274709 | A1* | 11/2007 | Ho ............................... 396/448 |
| 2008/0212958 | A1* | 9/2008 | Park et al. .................... 396/448 |

FOREIGN PATENT DOCUMENTS

KR 10-2005-0075241 A 7/2005
WO WO 2007123372 A1 * 11/2007

OTHER PUBLICATIONS

Translation of KR Publication No. 10-2005-0075241; Camera Door Opening and Shutting Apparatus for Mobilephone; Inventor: Gang; Publication Date: Jul. 20, 2005.*

* cited by examiner

*Primary Examiner*—Melissa J Koval
*Assistant Examiner*—Fang-Chi Chang
(74) *Attorney, Agent, or Firm*—Birch, Stewart, Kolasch & Birch, LLP

(57) ABSTRACT

A mobile communication terminal according to an exemplary embodiment, includes a terminal body having a camera lens hole, a lens cover member mounted at the terminal body and configured to open and close the camera lens hole, and a rotation member mounted at the terminal body and interlocking with the lens cover member such that lens cover member opens and closes when the rotation member is rotated.

19 Claims, 19 Drawing Sheets

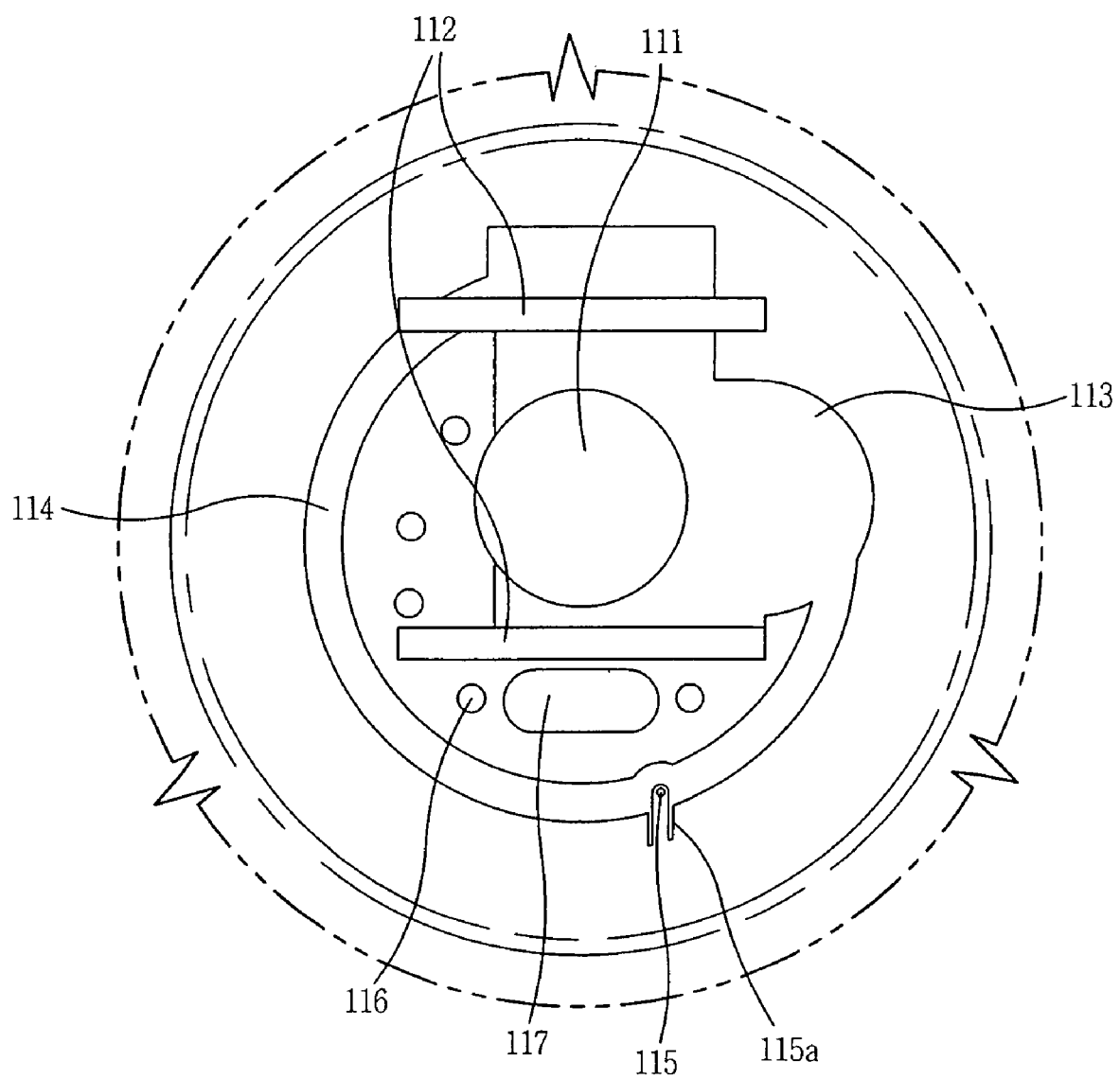

CAMERA LENS COVER DEVICE AND MOBILE COMMUNICATION TERMINAL HAVING THE SAME

RELATED APPLICATION

The present disclosure claims priority to Korean Application No. 10-2006-0067668, filed in Korea on Jul. 19, 2006, which is incorporated by reference in its entirety.

BACKGROUND

The present disclosure relates to a camera lens cover device and a mobile communication terminal having the same.

The related art mobile communication terminal provides the basic call service as well as other additional functions. For example, the mobile terminal includes a camera function allowing a user to take pictures and videos using the camera function of the terminal. The user is also able to transmit any captures pictures to another mobile terminal.

Further, because the mobile terminal is compact, the camera included in the terminal is also reduced in size. As the mobile communication terminal becomes smaller, the components included in the camera device also have to be more compact or sometimes even omitted. For example, the camera included in the mobile terminal does not include a lens cover. Thus, the lens of the camera included in the mobile terminal is exposed. Therefore, the user can easily take a picture by simply pointing the camera to a desired aspect and pressing a button on the terminal to take a picture.

However, because the lens is exposed, dirt or other foreign particles accumulate on the camera lens. Therefore, the user has to often clean the lens before taking pictures. The lens is also often scratched or stained when the user places the mobile terminal on a counter, in a desk, in a glove box of a car, etc. Therefore, the damaged lens often needs to be replaced. However, because the mobile terminal is compact and includes many components connected to one another, it is difficult and generally expensive to replace a lens or camera module in the mobile terminal.

BRIEF DESCRIPTION

The present inventors recognized at least the above-identified problems of certain conventional mobile phones. Based upon such recognition, the following features have been conceived.

Accordingly, one aspect of the present disclosure is to address the above-noted and other aspects.

Another aspect of the present disclosure is to provide a camera lens cover device for a camera included in a mobile communication terminal.

Yet another aspect of the present disclosure is to provide a simple, compact and easy to operate camera lens cover device for a camera included in the mobile terminal.

Still another aspect of the present disclosure is to provide a camera lens cover device that covers the lens of the camera and that contributes to the design of the mobile terminal.

To achieve these and other advantages and in accordance with the purpose of the present disclosure, as embodied and broadly described herein, the present disclosure provides in one aspect a mobile communication terminal including a terminal body having a camera lens hole, a lens cover member mounted at the terminal body and configured to open and close the camera lens hole, and a rotation member mounted at the terminal body and interlocking with the lens cover member such that the lens cover member opens and closes when the rotation member is rotated.

In another aspect, the present disclosure provides a camera lens cover device including a lens cover member mounted at a terminal body having a camera lens hole, in which the lens cover member is configured to open and close the camera lens hole, and a rotation operating member rotatably mounted at the terminal body and interlocking with the lens cover member such that the lens cover member opens and closes when the rotation member is rotated.

In still another aspect, the present disclosure provides a mobile communication terminal including a body, a camera installed in the body, a cover configured to cover the camera, and a cover operating member disposed on the body, and being coupled with the cover and having a hole through which the camera is exposed. Further, the cover operating member rotates relative to the body so as to operate the cover.

Further scope of applicability of the present disclosure will become apparent from the detailed description given hereinafter. However, it should be understood that the detailed description and specific examples, while indicating exemplary embodiments of the disclosure, are given by illustration only, since various changes and modifications within the spirit and scope of the disclosure will become apparent to those skilled in the art from this detailed description.

BRIEF DESCRIPTION OF THE DRAWINGS

FIG. 2C is an enlargement view showing the camera lens cover device;

DETAILED DESCRIPTION

Reference will now be made in detail to the exemplary embodiments of the present disclosure, examples of which are illustrated in the accompanying drawings.

The present disclosure advantageously provides a lens cover member that is rotatably operated so as to open and close a camera lens hole, and in which some components of the camera lens cover device constitute a design of a casing.

Figure 1:
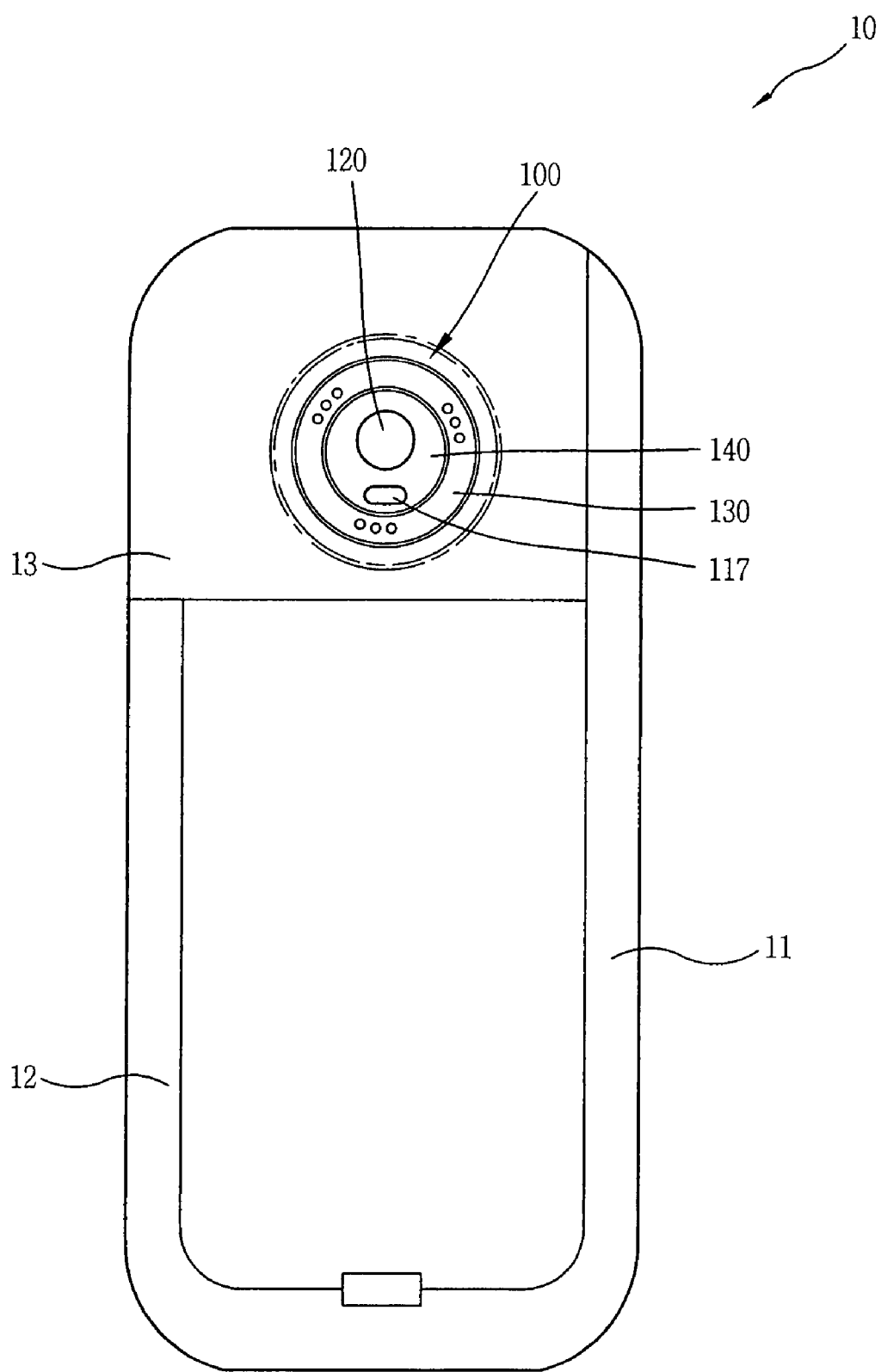
FIG. 1 is an overview showing a mobile communication terminal having a camera lens cover device according to an exemplary embodiment of the present disclosure.

In more detail, FIG. 1 illustrates a mobile communication terminal 10 having a camera lens cover device according to an exemplary embodiment of the present disclosure. As shown in FIG. 1, the mobile terminal 10 includes a terminal body 11, a battery 12, and a casing member 13 encasing a camera. Further, the camera includes a camera lens cover device 100.

The camera lens cover device 100 includes a lens cover member 120 for opening and closing a camera lens hole where a lens of the camera is disposed, and a rotation operating member 130 that interlocks with the lens cover member 120. Also shown is a coupling member 140 that couples the rotation operating member 130 to the terminal body 11 and a flash coupling hole 117 for accommodating a flash of the camera.

Figure 2A:
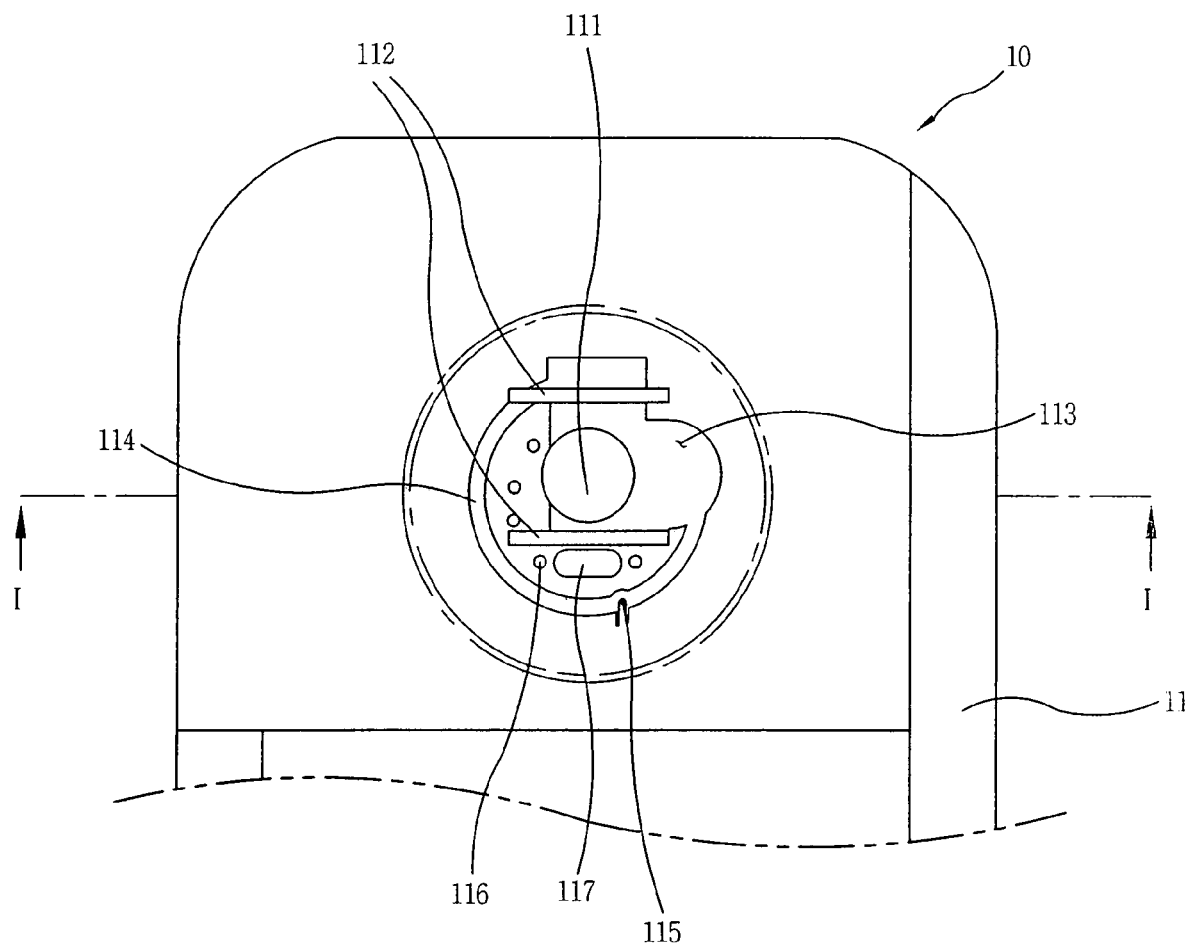
FIG. 2A is a planar view showing a terminal body having a mechanism of the camera lens cover device according to an exemplary embodiment of the present disclosure.
Figure 2B:
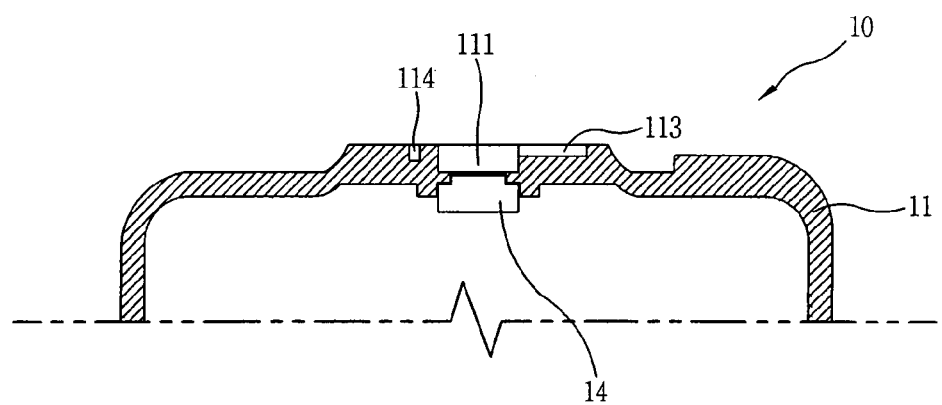
FIG. 2B is a schematic sectional view taken along line 'I-I' of FIG. 2A.

As shown in FIGS. 2A-2C, a camera lens hole 111 is disposed at a position where a camera 14 is mounted, thereby exposing the lens of the camera 14. Further, a cover member reception portion 113 receives the lens cover member 120 (see FIG. 1) and is formed near the camera lens hole 111. In addition, the cover member reception portion 113 has a shape corresponding to a shape of the lens cover member 120.

As shown in FIGS. 2A and 2C, a first guide groove 112 for sliding the lens cover member 120 is formed near the camera lens hole 111. The first guide groove 112 may be formed as shown in FIGS. 2A and 2C, or may be formed to have another shape such as an arc shape. In more detail, and as shown in FIG. 2A, the first guide groove 112 is formed so that the lens cover member 120 can be slid linearly in the first guide groove. The first guide groove 112 may also be formed so that the lens cover member 120 can slide back and forth in a reciprocating manner.

As shown in FIGS. 2A-2C, a second guide groove 114 is formed near the camera lens hole 111. The second guide groove 114 allows the rotation operating member 130 to rotate and thereby open and close the camera lens hole 111. As shown in FIGS. 2A and 2C, a stopper 115 is mounted at one side of the second guide groove 114. The stopper 115 is used to maintain a rotated position of the rotation operating member 130 by being engaged to a stopping recess 134a of the rotation operating member 130.

Further, the stopper 115 may be an elastic stopper that is configured to be operated by an elastic force, and protrudes from the terminal body 11. The stopper 115 may be a separate part assembled to the terminal body 11 or may be an integral part of the terminal body 11 that is formed to protrude from the terminal body 11. The stopper 115 may has a slit 115a. Further, the stopper 115 fixes a rotated position of the rotation operating member 130. The stopper 115 also prevents the camera lens hole 111 from being arbitrarily opened and closed when the rotation operating member 130 is rotated due to an external impact of the lens cover member 120. Also, FIGS. 2A and 2C illustrate one stopper 115, but a plurality of stoppers 115 may also be used to more stably fix a position of the rotation operating member 130.

In addition, FIGS. 2A and 2C also illustrate a coupling member joining recess 116 formed between the second guide groove 114 and the camera lens hole 111. The recess 116 receives and secures the coupling member 140 (see FIG. 1). Further, the coupling member joining recess 116 may have various structures. The flash coupling hole 117 is also shown in FIGS. 2A and 2C and is formed at a position adjacent to the camera lens hole 111 of the terminal body 11.

In addition, as shown in FIG. 1, the lens cover member 120 is mounted at the terminal body and used to open and close the camera lens hole 111. That is, the lens cover member 120 opens and closes the camera lens hole 111 by being interlocked with the rotation operating member 130. Further, the lens cover member 120 may have different type of structures. For instance, the lens cover member 120 slide back and forth in a reciprocating manner by being interlocked with the rotation operating member 130 or may rotate at an angle around a rotation shaft portion by being interlocked with the rotation operating member 130.

Figure 3:
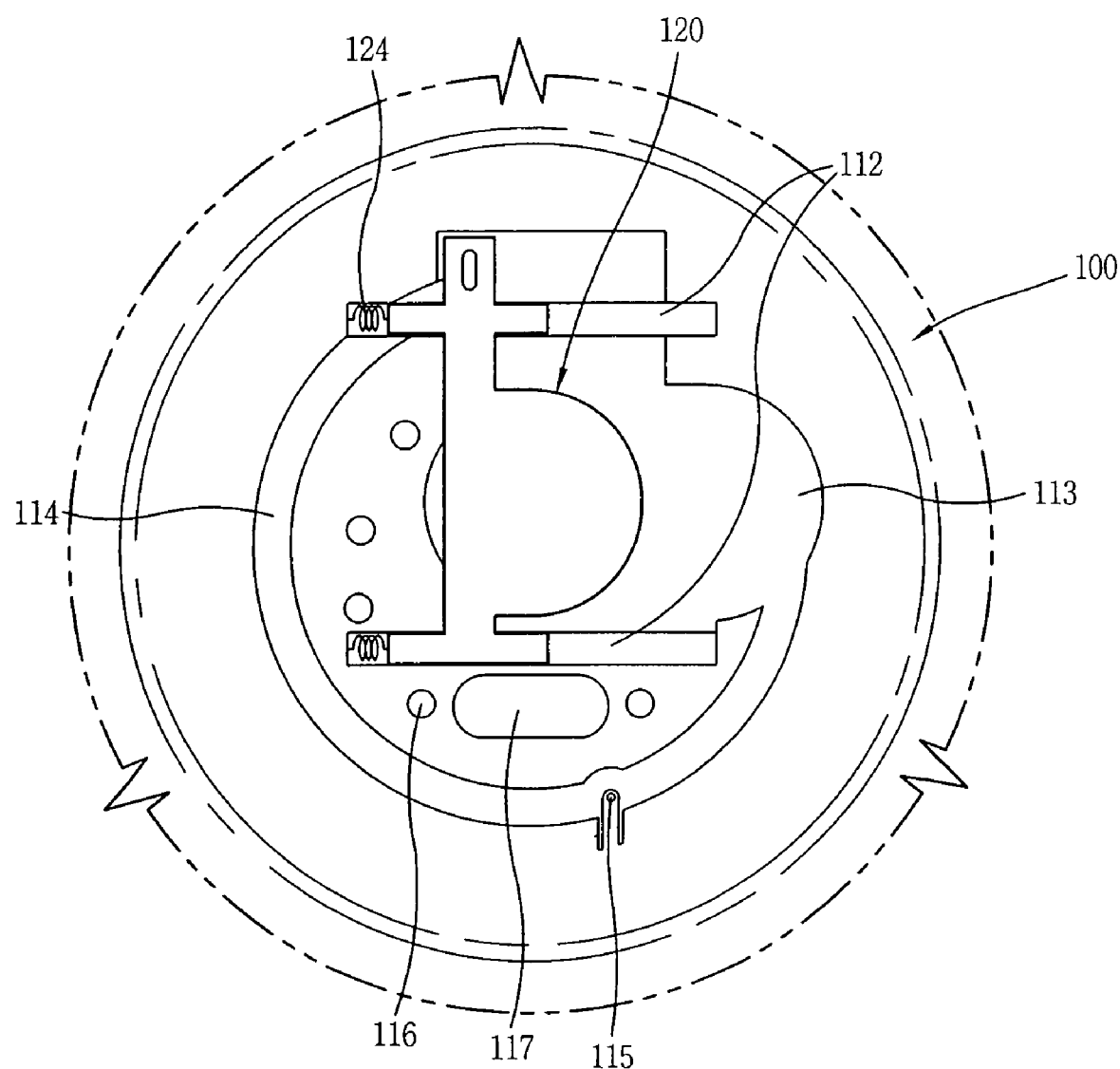
FIG. 3 is a planar view showing a lens cover member of the camera lens cover device being mounted at the terminal body of FIG. 2A.

FIG. 3 illustrates the lens cover member 120 reciprocating back and forth in a linear manner. As shown in FIG. 3, the lens cover member 120 is biased by an elastic member 124 and slides along the first groove 112 when the rotation member 130 is rotated. Further, as shown in FIGS. 4A and 4B, the lens cover member 120 includes a lens cover portion 121 having a size corresponding to that of the camera lens hole 111, guide protrusions 122 slid along the first guide groove 112, and a slot portion 123 connected to the rotation operating member 130 so as to be interlocked with the rotation operating member 130.

Figure 4A:
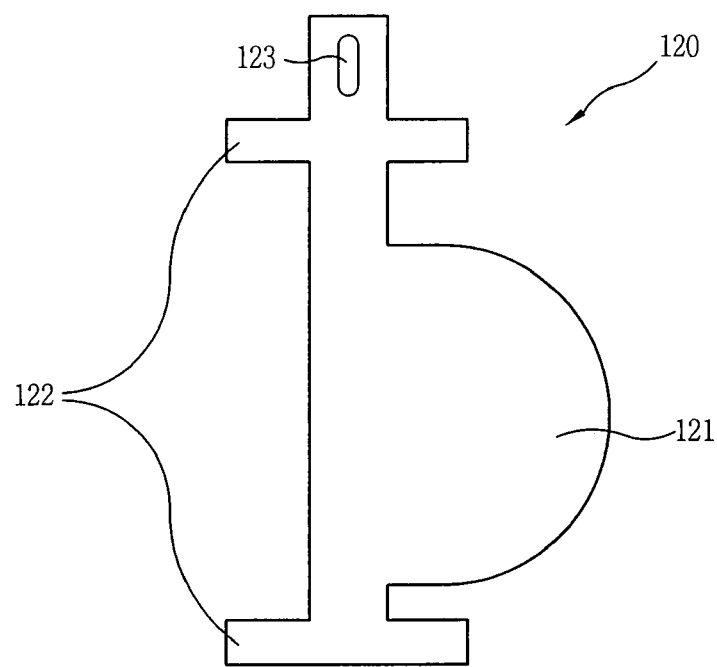
FIG. 4A is a planar view of the lens cover member of FIG. 3.
Figure 4B:
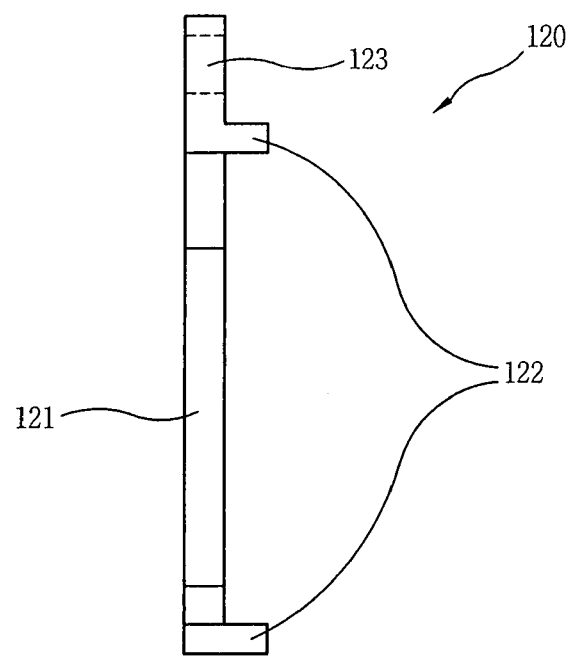
FIG. 4B is a lateral view of the lens cover member of FIG. 4A.

In addition, as shown in FIGS. 4A and 4B, the guide protrusions 122 are disposed at both ends of the lens cover portion 121 so that the lens cover member 120 stably reciprocates back and forth in a linear manner. In addition, the slot portion 123 extends from one of the guide protrusions 122.

Figure 5A:
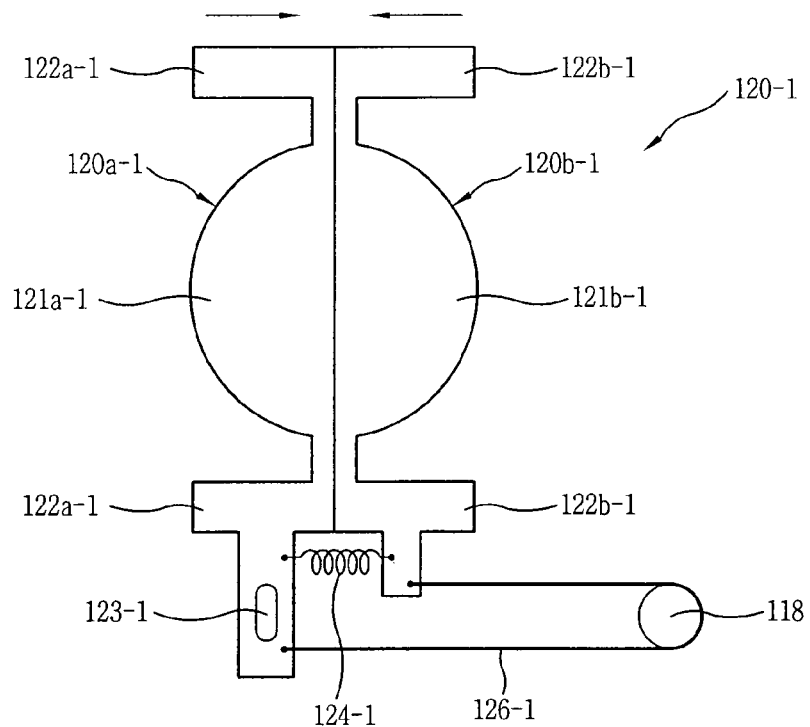
FIG. 5A is an overview showing a lens cover member of the camera lens cover device according to another exemplary embodiment of the present disclosure.
Figure 5B:
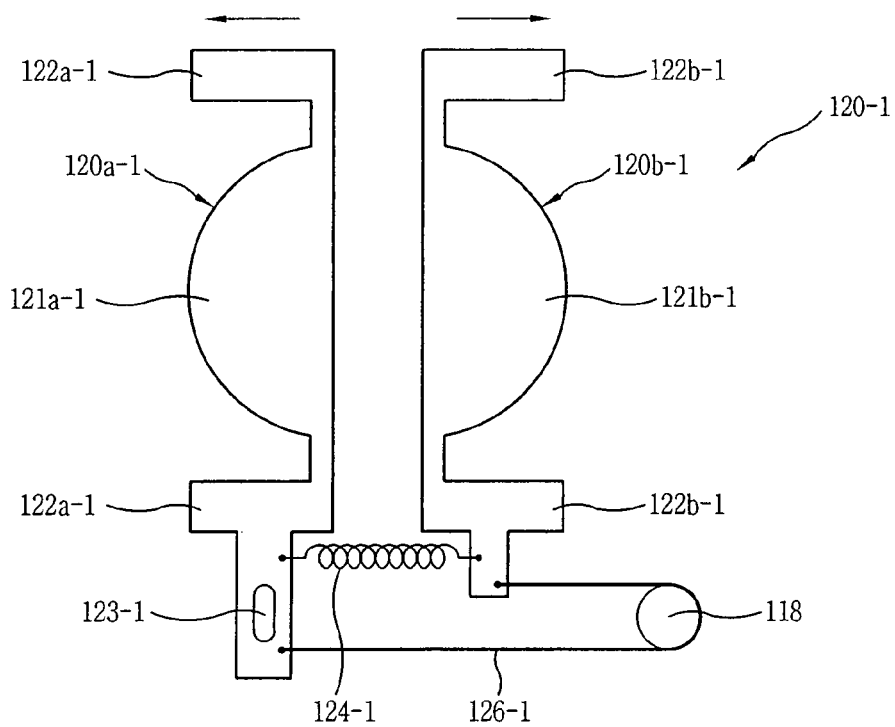
FIG. 5B is an overview showing the lens cover member of FIG. 5A being operated to open the camera lens hole.

Next, FIGS. 5A and 5B illustrate a different type of lens cover member 120-1 according to an exemplary embodiment of the present disclosure. As shown in FIGS. 5A and 5B, the lens cover member 120-1 includes a pair of lens cover members 120a-1 and 120b-1 having a size corresponding to that of the camera lens hole 111. Further, the lens cover members 120a-1 and 120b-1 include lens cover portions 121a-1 and 121b-1, and guide protrusions 122a-1 and 122b-1 that slid along the first guide groove 112. A slot portion 123-1 connected to the rotation operating member 130 is also included so as to be interlocked with the rotation operating member 130.

In addition, as shown in FIGS. 5A and 5B, the guide protrusions 122a-1 and 122b-1 are disposed at both ends of each of the lens cover portions 121a-1 and 121b-1 so that the lens cover member 120-1 stably reciprocates in a linear manner in the first guide groove 112. The slot portion 123-1 also extends from one of the guide protrusions 122a-1

Further, an elastic member 124-1 is coupled to the lens cover portions 121a-1 and 121b-1 so that the camera lens hole 111 can be opened as the lens cover portions 121a-1 and 121b-1 are interlocked with the rotation operating member 130. As shown in FIGS. 5A and 5B, the elastic member 124-1 is mounted so that the slot portion 123-1 and one guide protrusion 122b-1 facing each other are connected to each other.

FIGS. 5A and 5B also illustrate a rotation shaft 118 and wire 126-1 that open and close the lens cover members 120a-1 and 120b-1 when the rotation shaft is rotated via the rotation member 130. That is, FIG. 5A illustrates the lens cover members 120a-1 and 120b-1 being closed, and FIG. 5B illustrates the lens cover members 120a-1 and 120b-1 being opened.

Further, the slot portion 123-1 is interlocked with the rotation operating member 130 such that the lens cover members 120a-1 and 120b-1 are opened and closed based on the rotation member 130 being rotated. In addition, the wire 126-1 is configured so that the lens cover portion 121a-1 having the slot portion 123-1 and the lens cover portion 121b-1 are spaced apart from each other and are interlocked, and so that the slot portion 123-1 and one guide protrusion 122b-1 facing each other are connected to each other.

Figure 6A:
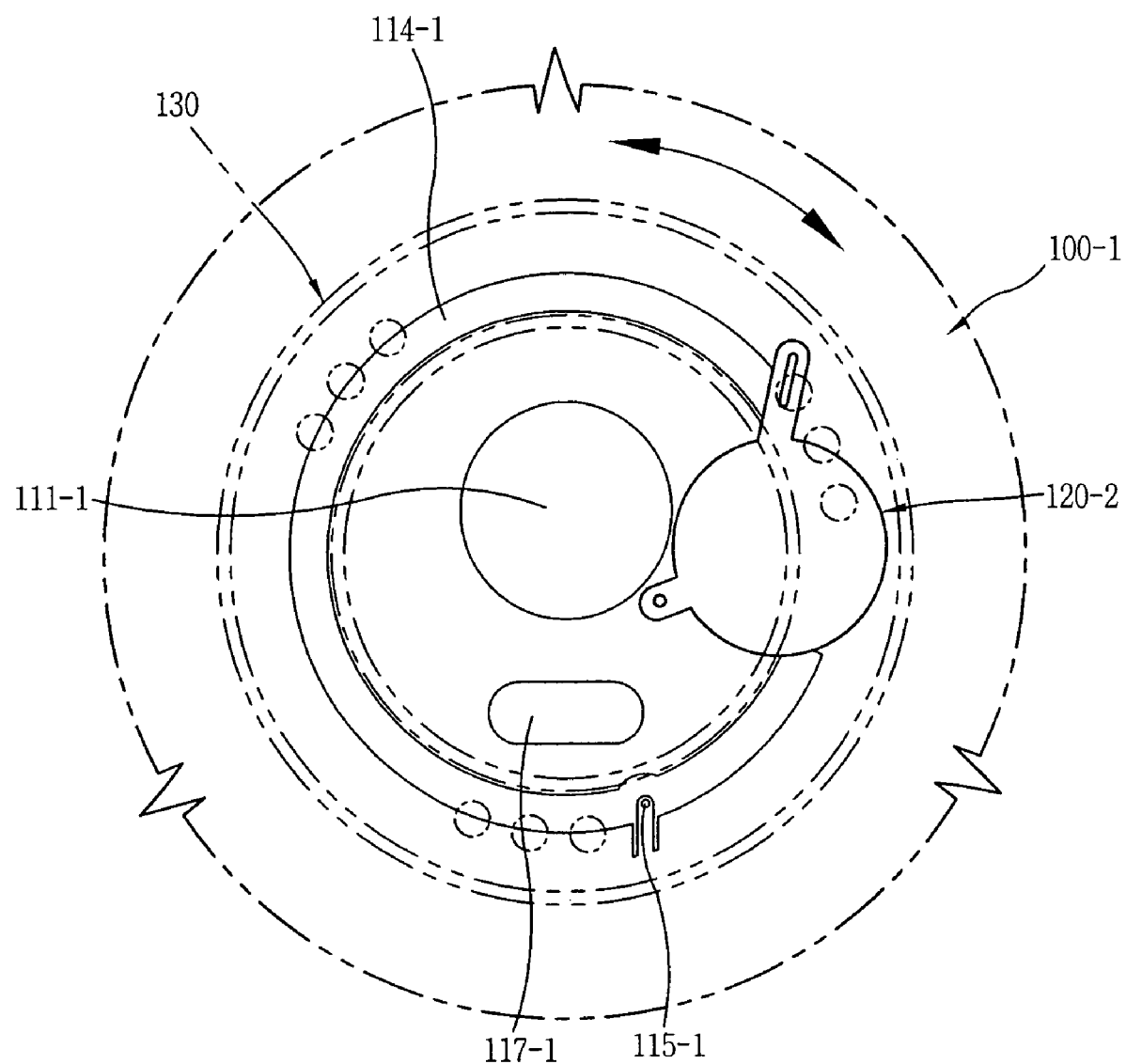
FIG. 6A is a planar view showing the camera lens cover member mounted at the terminal body according to another exemplary embodiment of the present disclosure.

A lens cover device 100-1 that rotates at an angle centering around a rotation shaft for opening and closing the camera lens hole 111 will be explained with reference to FIGS. 6A and 6B. As shown, the lens cover device 100-1 includes a lens cover member 120-2 having a lens cover portion 121-2 having an area corresponding to an area of the camera lens hole 111. Further, as shown in FIG. 6B, the lens cover portion 121-2 includes a rotation shaft portion 125-2 rotatably coupled to the terminal body 11.

Figure 6B:
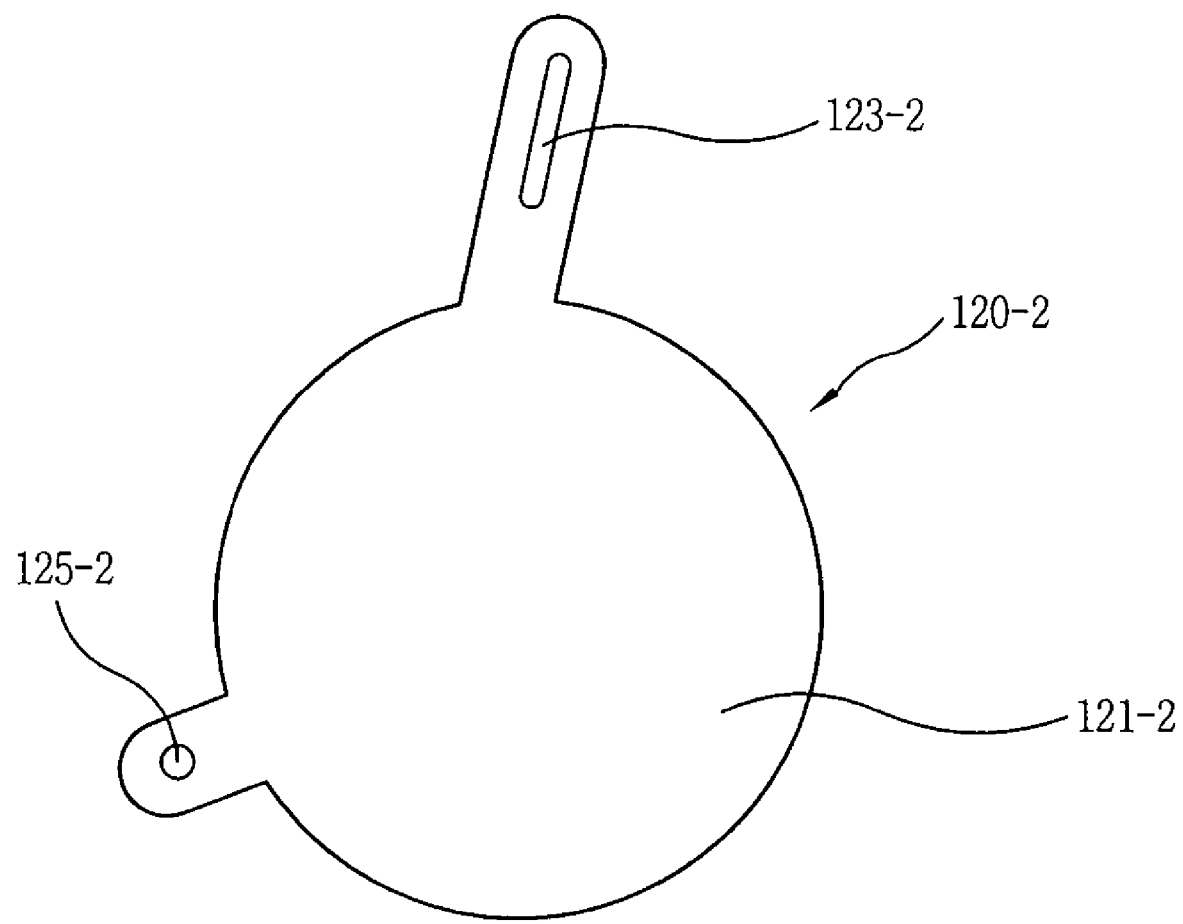
FIG. 6B is a planar view of the lens cover member of FIG. 6A.

Also illustrated in FIG. 6B is a slot portion 123-2 connected to the rotation operating member 130 so as to be interlocked with the rotation operating member 130. Further, as shown in FIG. 6A, the lens cover device 100-1 also includes a lens hole 111-1, a second guide groove 114-1 a stopper 115-1 and a flash coupling hole 117-1. Thus, as the rotation operating member 130 is rotated, the lens cover member 120-2 is rotated in an angular manner to open and close the lens hole 111-1.

Therefore, as discussed above, the lens cover members 120, 120-1 and 120-2 are interlocked with the rotation operating member 130 and thus open and close the respective lens hole 111 and 111-1 when the rotation operating member 130 is rotated. Further, the rotation operating member 130 may be mounted above the lens cover members 120, 120-1 and 120-2. That is, the rotation operating member 130 may be mounted so that an upper surface thereof is outwardly exposed, thereby contributing to the design of the casing of the terminal body 11. The design of the casing of the terminal body 11 is also implemented by the lens cover device 100.

Figure 7:
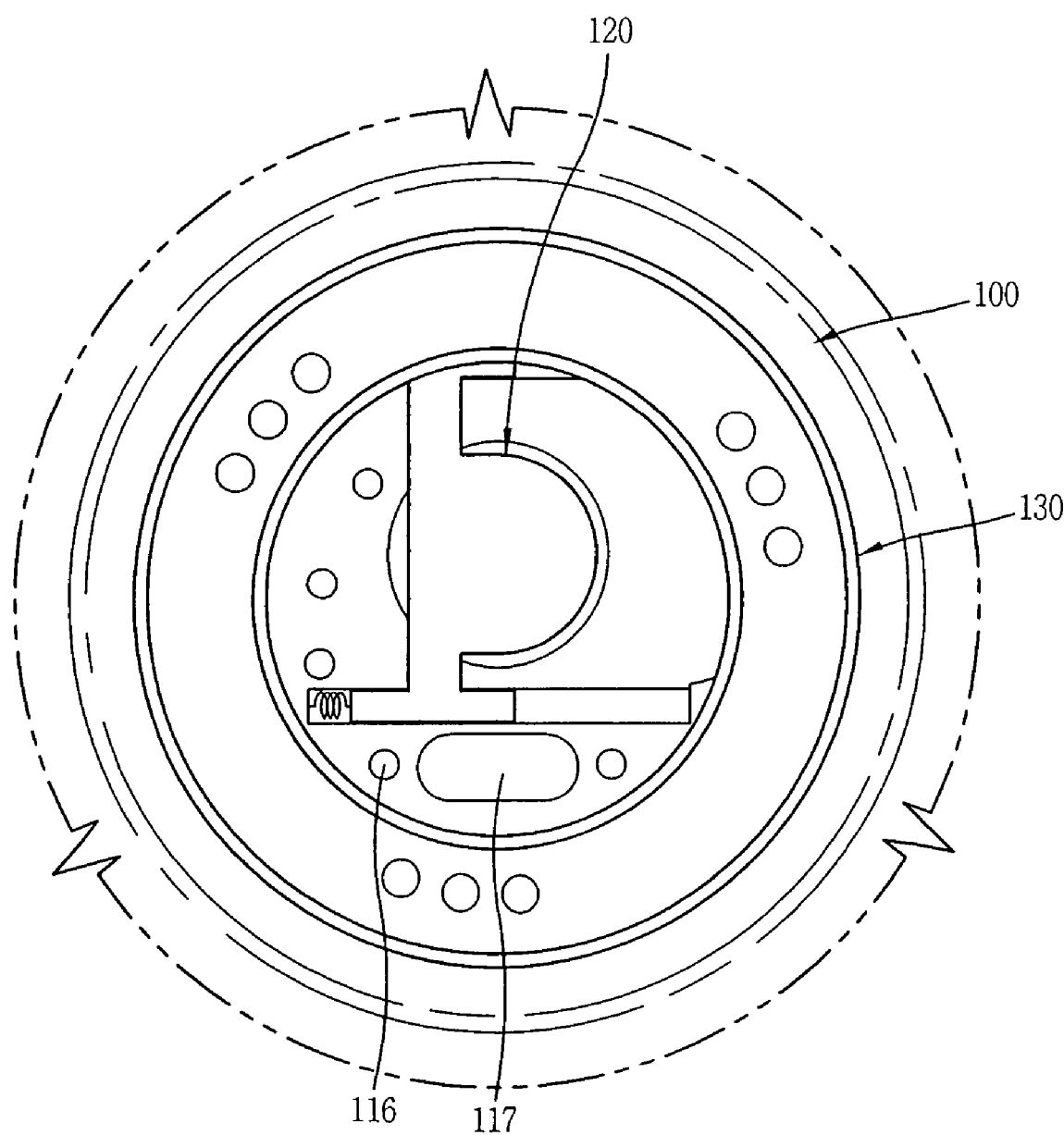
FIG. 7 is a planar view showing a rotation operating member of the camera lens cover device mounted at the terminal body of FIG. 3.
Figure 8A:
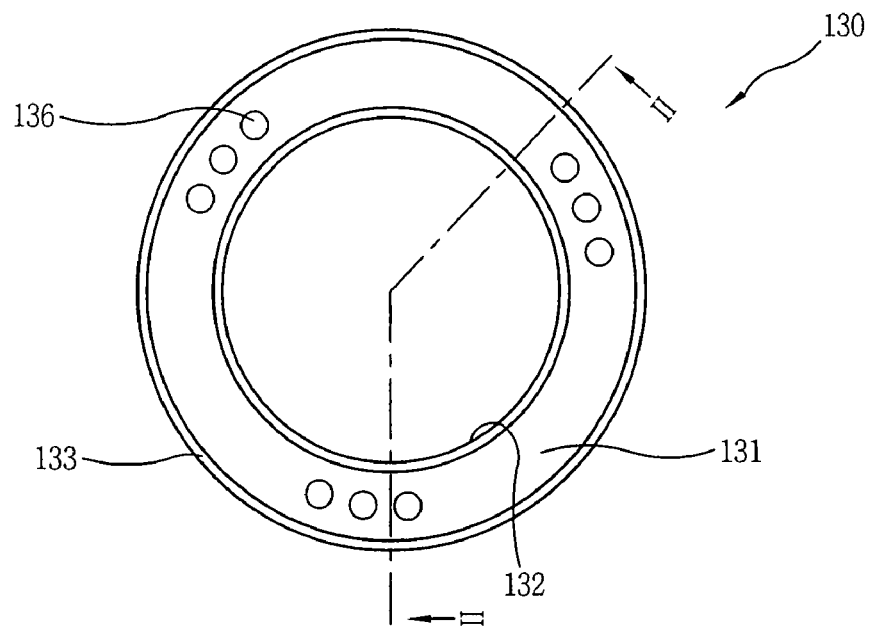
FIG. 8A is a planar view of the rotation operating member of FIG. 7.
Figure 8B:
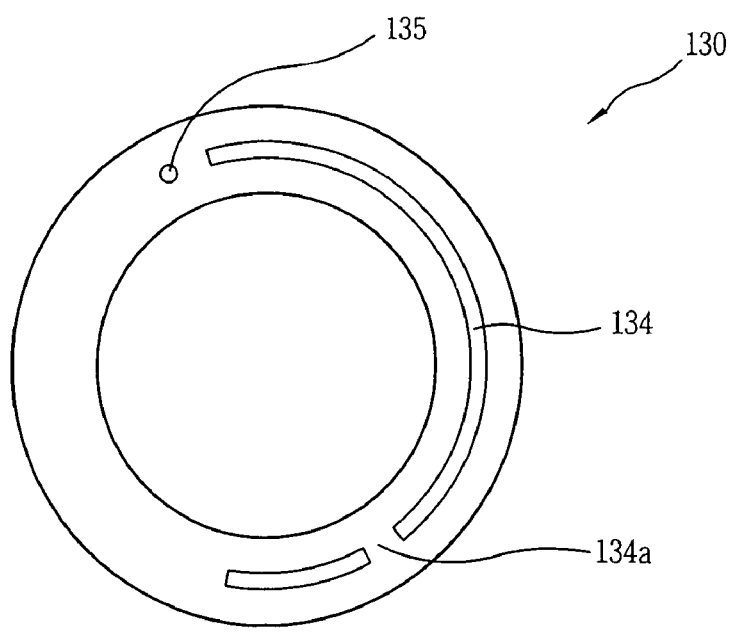
FIG. 8B is a rear view of the rotation operating member of FIG. 8A.
Figure 8C:
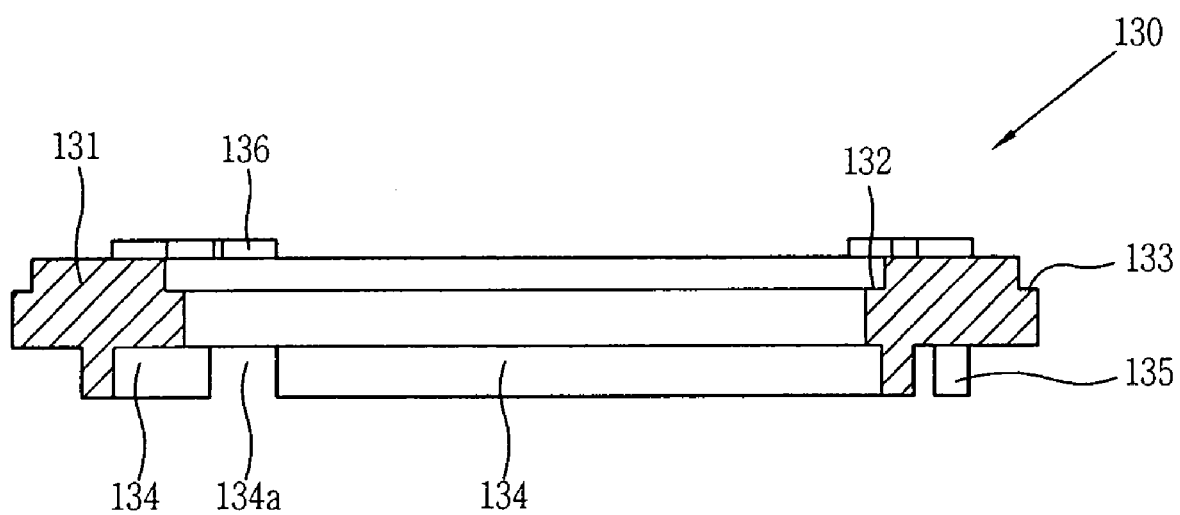
FIG. 8C is a sectional view taken along line 'II-II' of FIG. 8A.

In addition, as shown in FIG. 7, the rotation operating member 130 is mounted to interlock with the lens cover members 120. A similar concept applied to the lens cover members 120-1 and 120-2. Further, as shown in FIGS. 8A-8C, the rotation operating member 130 has a ring shape. However, the rotation operating member 130 may have a different shape. Also, as shown in FIGS. 8A-8C, the rotation operating member 130 includes a guide protrusion 134 disposed at an operating member body 131 having a ring shape so as to be slid along the second guide groove 114, and a coupling member 135 connected to each slot portion 123, 123-1 and 123-2 of the lens cover members 120, 120-1 and 120-2 so as to be interlocked with the lens cover members 120, 120-1 and 120-2.

Further, the guide protrusion 134 includes the stopping recess 134a at one side thereof. The stopping recess 134a is detachably mounted at the stopper 115. Alternatively, the stopping recess 134a and the stopper 115 may have a different structure as long as a rotated position of the rotation operating member 130 can be fixed.

In addition, as shown in FIGS. 5B and 5C, the coupling member 135 is positioned adjacent to one end of the guide protrusion 134. As discussed above, the coupling member 135 is connected to each slot portion 123, 123-1 and 123-2 of the lens cover members 120, 120-1 and 120-2 so as to be interlocked with the lens cover members 120, 120-1 and 120-2. Further, the coupling member 135 can have any structure as long as a rotation force of the rotation operating member 130 is transmitted to the lens cover members 120, 120-1 and 120-2 to open and close the camera lens hole 111.

In addition, as shown in FIG. 8C, a nonskid portion 136 may be formed on an upper surface of the rotation operating member 130. Further, the coupling member 140 may be insertion-coupled to the terminal body 11 in the rotation operating member 130. That is, the rotation operating member 130 is configured not to be detached from the terminal body 11 using the coupling member 140. A first stepped portion 132 is also formed on an inner circumferential edge of the rotation operating member 130 so that the rotation operating member 130 can be adhered to the terminal body 11 by the coupling member 140.

Similarly, a second stepped portion 133 is formed on an outer circumferential edge of the rotation operating member 130 so that the rotation operating member 130 can be adhered to the terminal body 11 by the casing member 13 that will be explained later. In addition, only one of the first stepped portion 132 and the second stepped portion 133 may be formed, or both the first stepped portion 132 and the second stepped portion 133 may be formed. For example, the first stepped portion 132 and the second stepped portion 133 may not be formed at the rotation operating member 130 according to a mounting structure of the rotation operating member 130 to the terminal body 11.

In addition, the rotation operating member 130 may include an elastic member at one side of the guide protrusion 134. In this instance, a downward slope portion may be formed at a bottom surface of the second guide groove 114 of the terminal body 11 in both directions. That is, the second guide groove 114 may have a cam structure that a central portion thereof is upwardly inclined and both end portions thereof are downwardly inclined. Thus, when the elastic member of the rotation operating member 130 moves to the central portion of the second guide groove 114, the rotation operating member 130 can slide in the moving direction by an elastic force of the elastic member.

Further, the rotation operating member 130 is configured to rotate in a clockwise or counterclockwise direction along the second guide groove 114. Accordingly, the lens cover members 120, 120-1 and 120-2 are interlocked with each other, thereby opening and closing the camera lens hole 111.

Figure 9A:
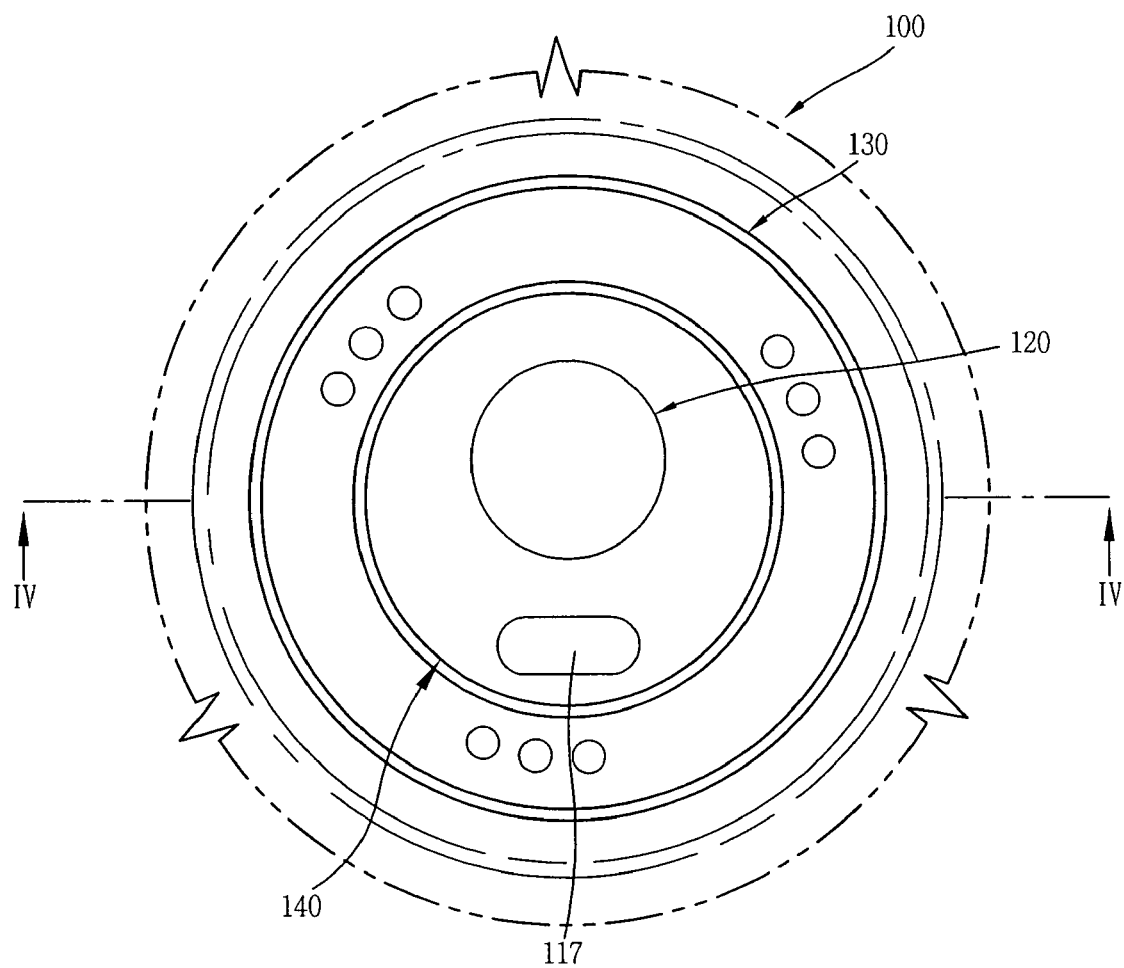
FIG. 9A is a planar view showing a coupling member being coupled to the camera lens cover member of FIG. 7.
Figure 9B:
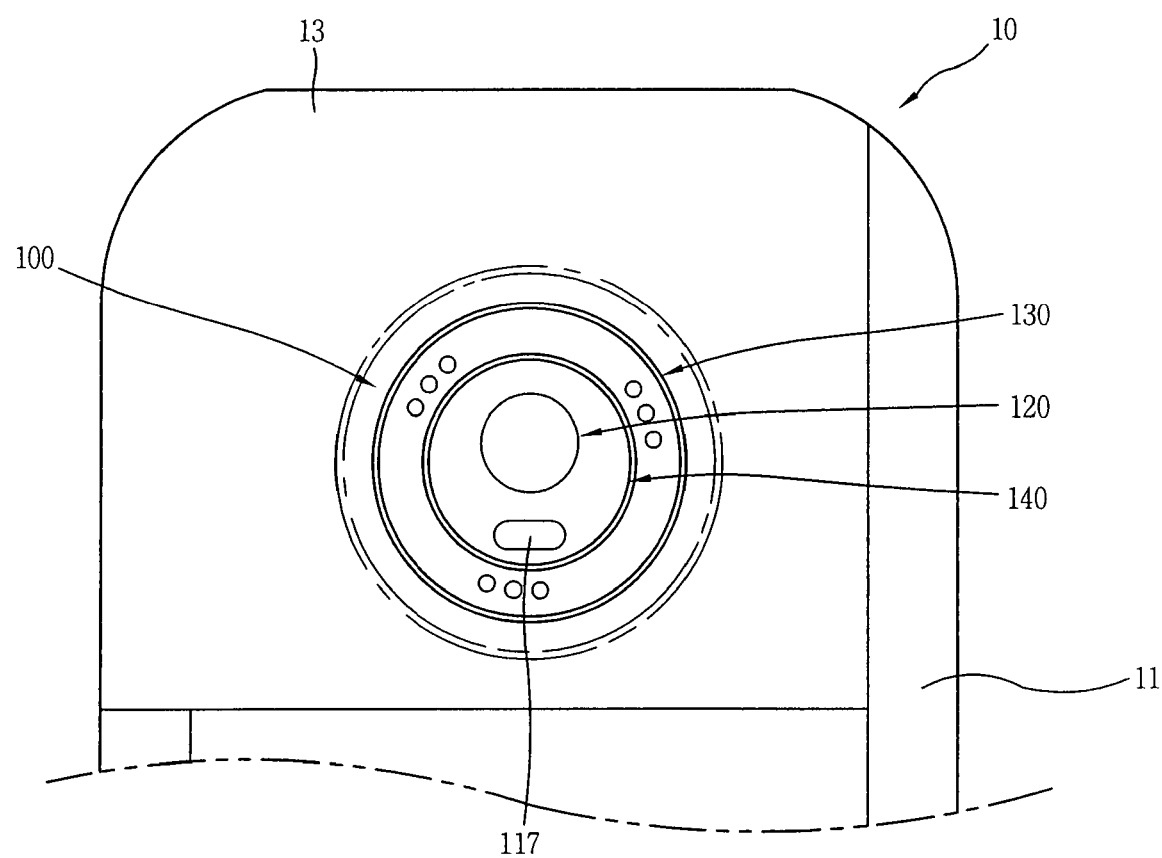
FIG. 9B is a planar view showing a casing member being coupled to the rotation operating member of FIG. 7.

As shown in FIGS. 9A and 9B, the coupling member 140 inserted into a central portion of the rotation operating member 130 prevents the rotation operating member 130 from being separated from the terminal body 11. Further, the rotation operating member 130 is rotatably mounted at the terminal body 11 so as to be interlocked with the lens cover member 120.

Figure 10A:
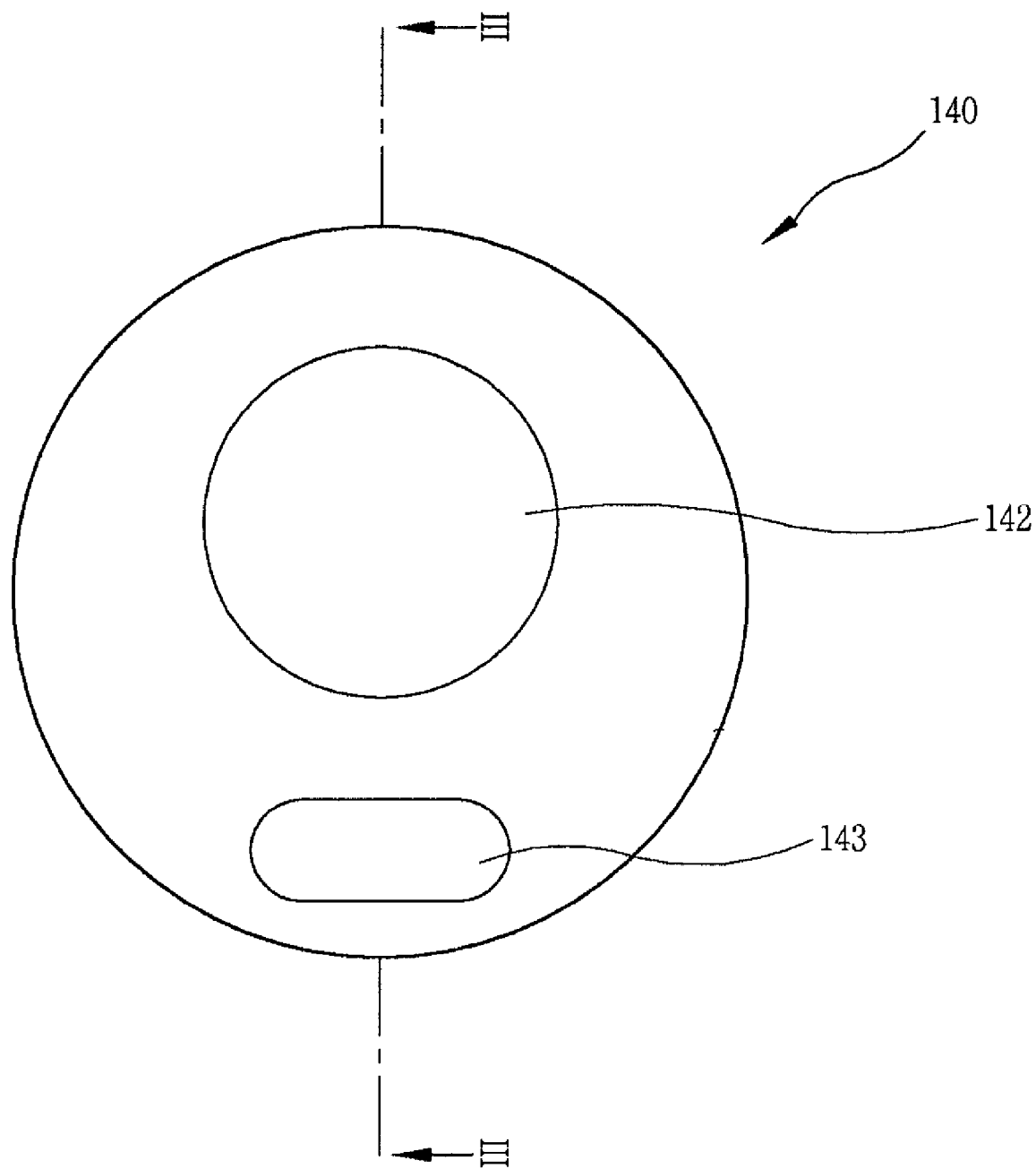
FIG. 10A is a planar view of the coupling member of FIG. 9.
Figure 10B:
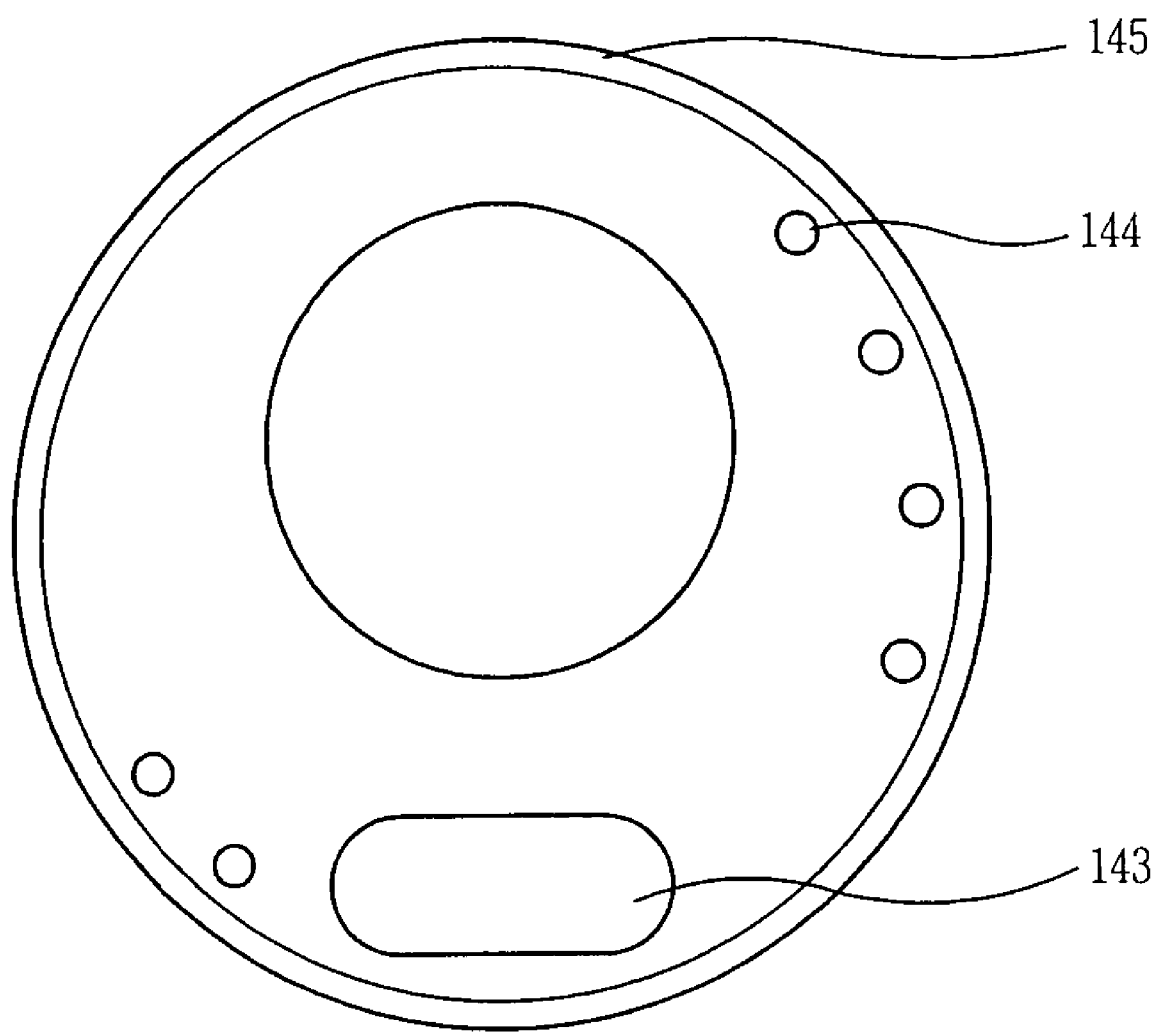
FIG. 10B is a rear view of the coupling member of FIG. 10A.
Figure 10C:
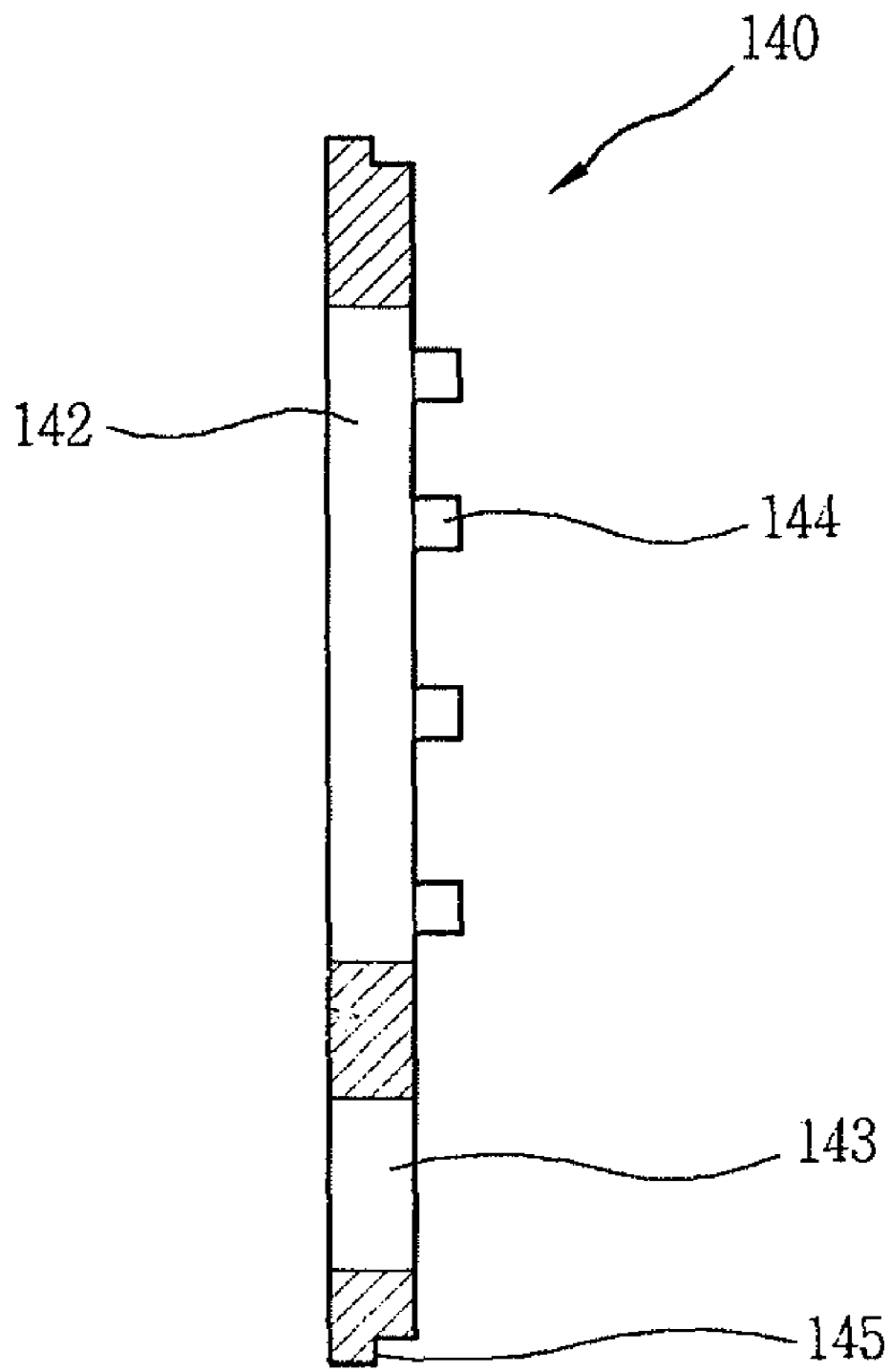
FIG. 10C is a sectional view taken along line 'III-III' of FIG. 10A.
Figure 11:
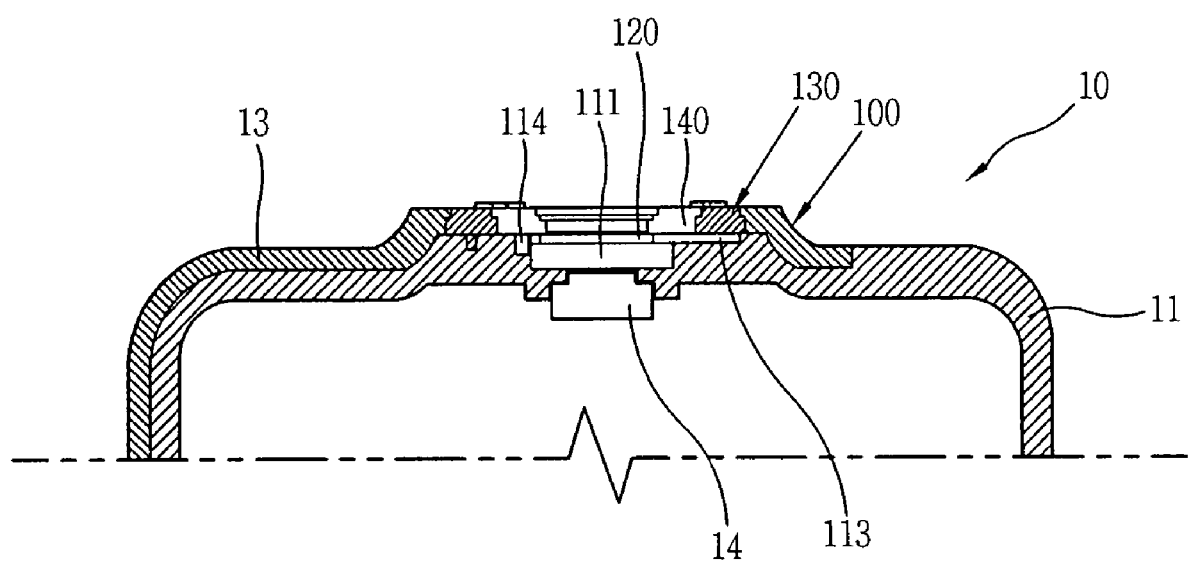
FIG. 11 is a sectional view taken along line 'IV-IV' of FIG. 9.

As shown in FIGS. 10A-10C, the coupling member 140 has a size and a shape corresponding to a hole of the rotation operating member 130 so as to be inserted into the rotation operating member 130. Further, as shown in FIGS. 10A and 10C, the coupling member 140 is provided with a camera lens hole 142 at a position corresponding to the camera lens hole 11, thereby exposing a lens of the camera 14. Also, as shown in FIGS. 10A-10C, the coupling member 140 includes a flash lens hole 143 at a position corresponding to the flash coupling hole 117 formed at the terminal body 11, thereby passing light emitted from a flash of the camera 14.

FIGS. 10B and 10C illustrate one or more coupling protrusions 144 formed on one surface of the coupling member 140 in correspondence to the coupling member joining recess 116 formed at the terminal body 11. The above structure of the coupling member joining recess 116 and the coupling protrusion 144 is only an example, and the coupling member 140 may be coupled to the terminal body 11 by various other types of structures.

Further, the coupling member 140 is inserted into the rotation operating member 130 so as to support the first stepped portion 132 formed on an inner circumferential edge of the rotation operating member 130. That is, the coupling member 140 is coupled to the terminal body 11 so that an outer circumferential edge of the coupling member 140 presses against the first stepped portion 132 formed on an inner circumferential edge of the rotation operating member 130.

As shown in FIG. 10C, a stepped portion 145 is also formed on the outer circumferential edge of the coupling member 140 so as to be engaged with the first stepped portion 132 formed on the inner circumferential edge of the rotation operating member 130. In addition, the coupling member 140 presses the rotation operating member 130 with an intensity strong enough to rotate the rotation operating member 130.

further, when the rotation operating member 130 is configured not to be separated from the terminal body 11 without the coupling member 140, the coupling member 140 may be used to implement the design of the casing or may not be required. That is, the coupling member 140 is not limited to have the configuration for preventing the rotation operating member 130 from being separated from the terminal body 11.

In addition, as shown in FIG. 9B, the casing member 13 is coupled to an outer surface of the rotation operating member 130 so as to press the second stepped portion 133 formed on an outer circumferential edge of the rotation operating member 130. However, the casing member 13 is not limited to the above configuration. For example, when the rotation operating member 130 is configured not to be separated from the terminal body 11 without the casing member 13, the casing member 13 may be used to implement the design of the casing or may not be required.

In addition, the rotation operating member 130 is configured not to be separated from the terminal body 11 by either the coupling member 140 or the casing member 13, or by both the coupling member 140 and the casing member 13. However, neither the coupling member 140 nor the casing member 13 may be required. Further, the casing member 13, the rotation operating member 130 and the coupling member 140 are exposed outside of the terminal body 11, and thus are also used to implement the design of the casing as shown in FIG. 9B. In addition, the rotation operating member 130 is interlocked with the lens cover member 120, and constitutes the casing member.

Figure 12A:
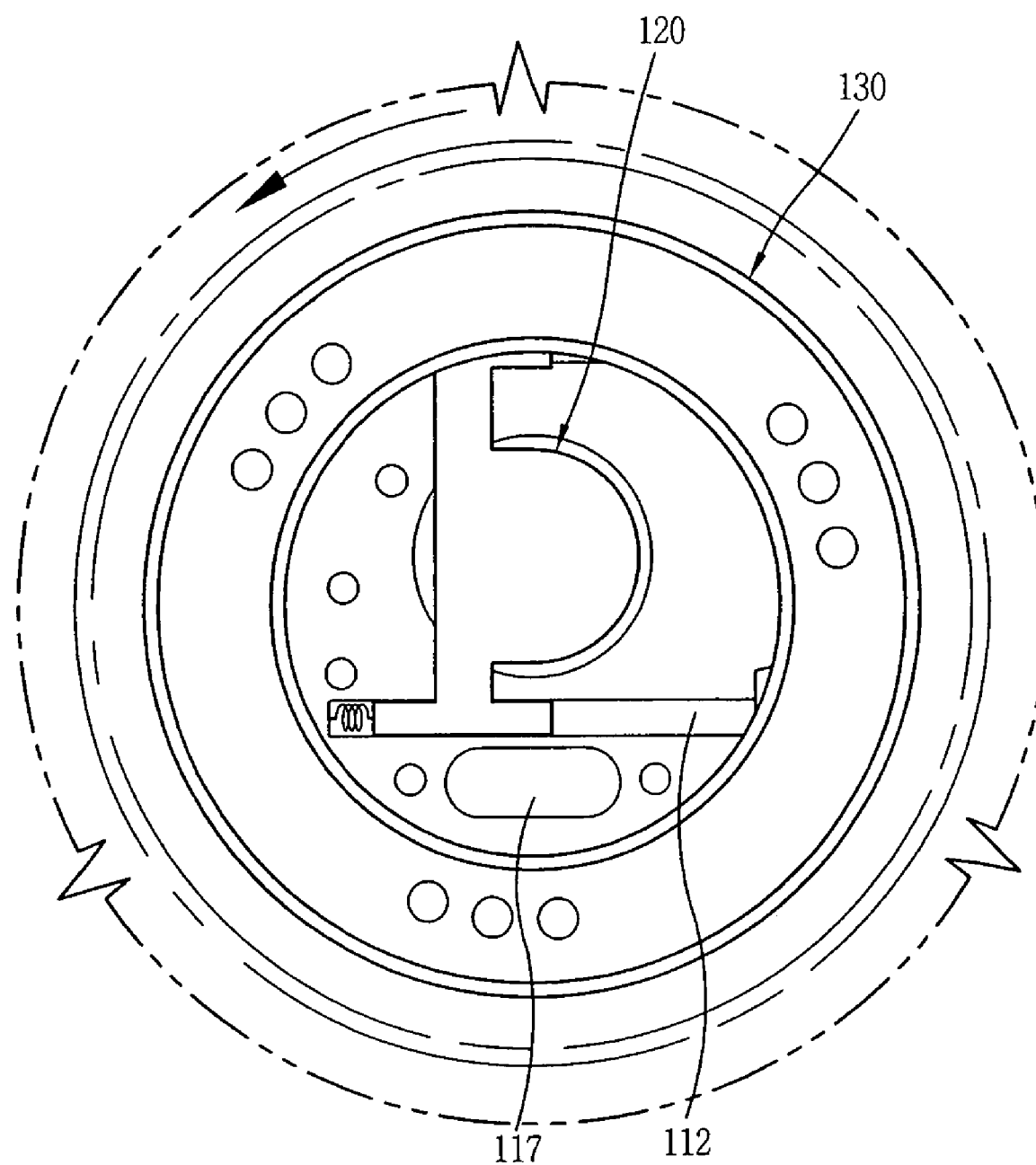
FIG. 12A is a planar view showing a camera lens hole being closed by the camera lens cover device according to an exemplary embodiment of the present disclosure.
Figure 12B:
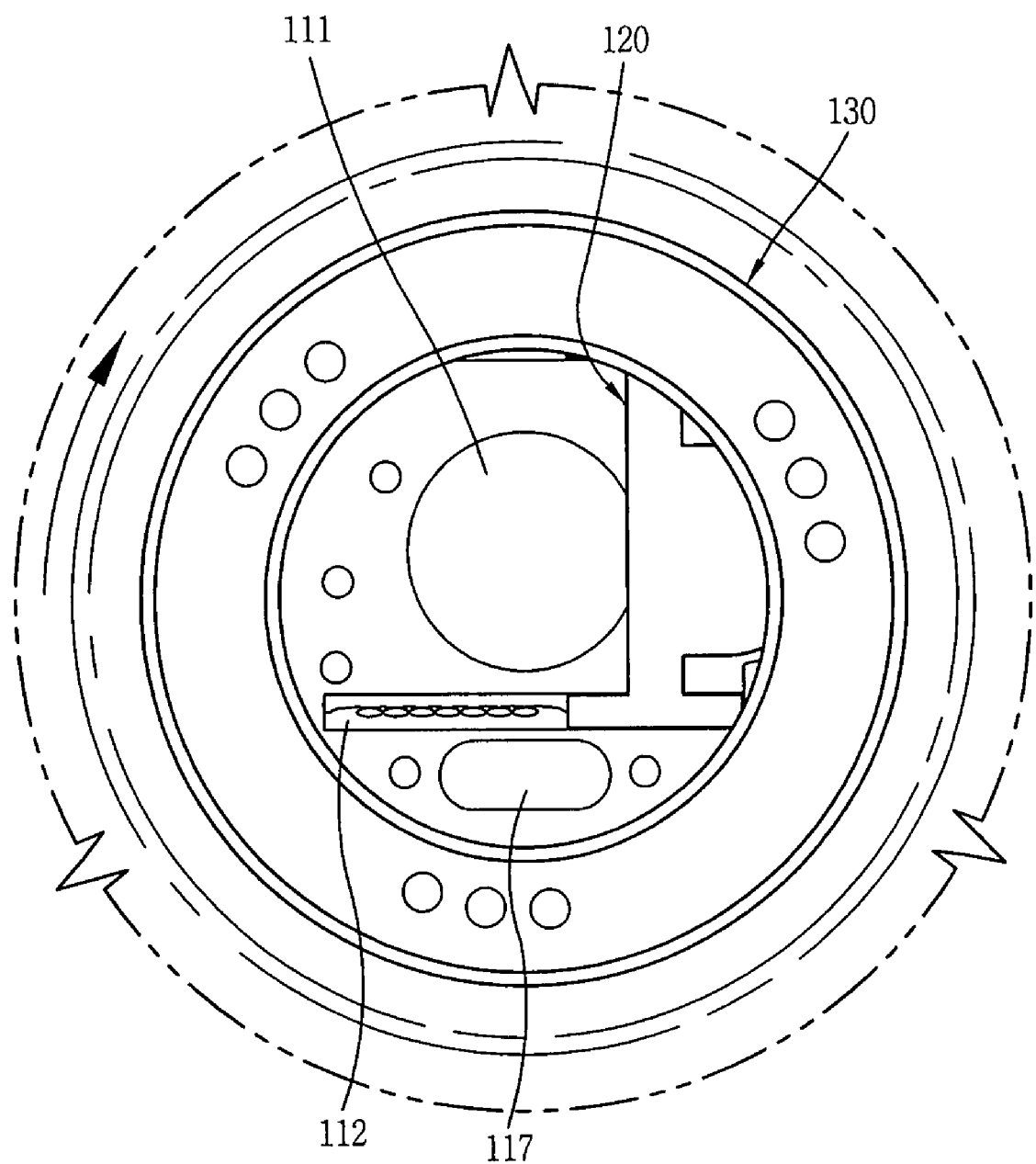
FIG. 12B is a planar view showing the camera lens hole being opened by the camera lens cover device according to an exemplary embodiment of the present disclosure.

Next, as shown in FIGS. 12A and 12B, when the rotation operating member 130 is rotated in one direction (i.e., a clockwise direction), the lens cover member 120 is moved in a direction to open the lens of the camera 14 by being interlocked with the rotation operating member 130. Further, when the lens cover member 120 is moved, the lens of the camera 14 is opened.

In addition, when the rotation operating member 130 is configured so that the stopping recess 134a is locked by the stopper 115, a rotated position of the rotation operating member 130 is fixed such that the lens of the camera 14 is completely exposed. Further, the rotated position of the rotation operating member 130 can be fixed by another configuration, i.e., by a cam structure of a bottom surface of the second guide groove 114 of the terminal body 11 and by an elastic member such as a plate spring mounted at the rotation operating member 130 so that the rotation operating member 130 can be slid in both directions based on a central portion of a sliding distance by an elastic force.

In addition, when the rotation operating member 130 is rotated in another direction (i.e., a counterclockwise direction), the lens cover member 120 is moved in a direction to close the lens of the camera 14 by being interlocked with the rotation operating member 130. That is, as the lens cover member 120 is moved, the lens of the camera 14 is closed. As discussed above, a rotated position of the rotation operating member 130 can be fixed by the stopper 115 and the stopping recess 134a, or by a cam structure of a bottom surface of the second guide groove 114 and by an elastic member such as a plate spring mounted at the rotation operating member 130.

In addition, in exemplary embodiments of the present disclosure, the camera lens is prevented from being damaged or stained. Also, some of the components used in the camera lens cover device of the present disclosure also contributing to the design of the casing of the terminal body. Accordingly, the design of the casing of the mobile communication terminal is optimized.

Further, because the camera lens cover device of the present disclosure has a simple mechanism, the mobile communication terminal can have a small size. Also, because the camera lens cover device has a simple mechanism and some components of the camera lens cover device implement the design of the casing of the terminal body, the cost of manufacturing the mobile terminal is reduced.

that is, the camera lens cover device according to exemplary embodiments of the present disclosure protect the camera lens and prevent the camera lens from being stained or damaged is required. The camera lens cover device also satisfies several conditions such as a condition not to increase the size of the mobile communication terminal, a condition to have a simple mechanism, a condition not to limit a casing design of the mobile communication terminal, etc.

Furthermore, because the camera lens cover device can be operated without an additional component, the external design of the mobile communication terminal is enhances.

As the present disclosure may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, and other characteristics of the exemplary embodiments described herein may be combined in various ways to obtain additional and/or alternative exemplary embodiments.

What is claimed is:

1. A mobile communication terminal, comprising:
a terminal body having a camera lens hole;
a lens cover member movably mounted at the terminal body and configured to open and close the camera lens hole; and
a rotation member rotatably mounted on the terminal body such that the rotation member can be rotated according to a user's manipulation, and interlocking with the lens cover member such that the lens cover member opens and closes when the rotation member is rotated,
wherein the rotation member is directly coupled to the lens cover member and interlocks with the lens cover member such that the lens cover member moves in a linear motion when the rotation member is rotated.

2. The mobile communication terminal of claim 1, wherein the lens cover member comprises:
a lens cover portion;
a pair of guide protrusions disposed at both ends of the lens cover portion; and
a slot portion extending from one of the guide protrusions.

3. The mobile communication terminal of claim 1, wherein the lens cover member includes a pair of right and left lens cover members, and
wherein each of the right and left lens cover members includes:
a lens cover portion;
a pair of guide protrusions disposed at both ends of the lens cover portion;
a slot portion extending from one of the guide protrusions;
an elastic member connected between the slot portion and one of the guide protrusions adjacent to the slot portion; and
an interlocking member including a wire connected to each end of the pair of guide protrusions, and a rotation shaft on which the wire is wound.

4. The mobile communication terminal of claim 1, wherein the terminal body comprises:
a first guide groove configured to move the lens cover member;
a second guide groove configured to rotate the rotation member; and
a stopper disposed at one side of the second guide groove.

5. The mobile communication terminal of claim 4, wherein the first guide groove and the lens cover member are connected to an elastic member so that the lens cover member is movable in one direction by an elastic force of the elastic member.

6. The mobile communication terminal of claim 4, wherein one end of the second guide groove and the rotation member are connected to an elastic member so that the rotation member is rotatable in one direction by an elastic force by the elastic member.

7. The mobile communication terminal of claim 4, wherein the terminal body further comprises a flash coupling hole near the camera lens hole.

8. The mobile communication terminal of claim 4, wherein the second guide groove has a cam structure.

9. The mobile communication terminal of claim 4, wherein the rotation member comprises:
an operating member body having a ring shape;
a guide protrusion disposed on one surface of the operating member body;
a coupling member disposed adjacent to one end of the guide protrusion; and
a first stepped portion disposed at an inner circumferential end of the operating member body at an opposite surface to the surface where the guide protrusion is formed.

10. The mobile communication terminal of claim 9, wherein the rotation member further comprises a second stepped portion disposed at an outer circumferential end of the operating member body at an opposite surface to the surface where the guide protrusion is formed.

11. The mobile communication terminal of claim 4, wherein the rotation member further comprises a nonskid portion at an opposite surface to the surface where the guide protrusion is formed.

12. The mobile communication terminal of claim 1, wherein the rotation member further comprises an elastic member mounted at a surface of the rotation member to which the terminal body is coupled.

13. The mobile communication terminal of claim 1, further comprising:
a coupling member configured to rotatably couple the rotation member to the terminal body.

14. The mobile communication terminal of claim 13, wherein the coupling member comprises:
a coupling member body;
a camera lens hole and a flash passing hole at a central portion of the coupling member body; and
a stepped portion at an edge of the coupling member body.

15. The mobile communication terminal of claim 1, wherein the terminal body comprises:
a first guide hole configured to slide the lens cover member;
a second guide hole configured to slide the rotation member; and
a cover member reception portion configured to receive the lens cover member,
wherein the lens cover member comprises:
a lens cover portion having an area corresponding to an area of the camera lens hole;
guide protrusions disposed at both ends of the lens cover portion so as to be slid along the first guide hole; and
a slot portion extending from one of the guide protrusions, and
wherein the rotation member comprises:
an operating member body having a ring shape; and
a guide protrusion disposed on one surface of the operating member body, and coupled to the slot portion.

16. The mobile communication terminal of claim 15, further comprising:
a stopper disposed at one side of the second guide groove; and
a stopping member on the rotation member adjacent to one end of the guide protrusion and configured to engage with the stopper so as to stop a rotation of the rotation member.

17. A mobile communication terminal, comprising:
a body;
a camera installed in the body;
a cover configured to cover the camera and movably mounted on the terminal body; and
a cover operating member rotatably mounted on the body such that the cover operating member can be rotated by a user's manipulation, and being directly coupled with the cover and having a hole through which the camera is exposed,
wherein the cover operating member rotates relative to the body so as to operate the cover and interlocks with the cover such that the cover moves in a linear motion when the cover operating member is rotated.

18. The mobile communication terminal of claim 17, wherein the cover is slidably connected to the body.

19. The mobile communication terminal of claim 18, further comprising:

a flash adjacent to the camera, wherein the cover covers the flash and the camera.

* * * * *